United States Patent [19]

Steward

[11] 4,173,968
[45] Nov. 13, 1979

[54] RECEIVER FOR SOLAR ENERGY

[76] Inventor: Willis G. Steward, Sugar Loaf Rd., Swiss Peaks, Boulder, Colo. 80302

[21] Appl. No.: 687,137

[22] Filed: May 17, 1976

[51] Int. Cl.² ............................................. F24J 3/02
[52] U.S. Cl. .................................... 126/438; 126/443
[58] Field of Search ............................... 126/270, 271

[56] References Cited

U.S. PATENT DOCUMENTS

| 811,274 | 1/1906 | Carter | 126/271 |
|---|---|---|---|
| 2,760,920 | 8/1956 | Olsen | 126/270 |
| 3,993,528 | 11/1976 | Pauly | 126/270 |

FOREIGN PATENT DOCUMENTS

635283  12/1927  France .................................. 126/271

Primary Examiner—Lloyd L. King
Attorney, Agent, or Firm—O'Rourke & Harris

[57] ABSTRACT

An articulated receiver particularly adapted to collect energy from a fixed, substantially spherical concave collector, the reciever being an elongated member having radiant energy absorbing means, and preferably a conduit therein for a heat transfer medium, and a radiation transparent enclosure in the form of a substantially elongated member having at least one enlarged cross sectional portion disposed preferably towards the end of the receiver most remote from the collector.

7 Claims, 5 Drawing Figures

RECEIVER FOR SOLAR ENERGY

BACKGROUND OF THE INVENTION

1. Field of the Invention.

The present invention relates generally to receivers for solar energy, and more particularly to a receiver having a solar radiation transparent enclosure with an enlarged end portion and articulated for movement relative to a fixed, substantially fixed spherical concave collector for concentrating solar energy on the receiver.

2. Description of the Prior Art.

Systems for collecting and concentrating solar energy are known. Generally, such systems involve a relatively large reflective concave collector which is articulated to track the sun and focus the reflective solar energy on a fixed receiver relative to the collector.

However, another particularly advantageous system exists in which a large, fixed concave substantially truncated spherical section collector is utilized to reflect concentrated solar energy onto a receiver which moves relative to the fixed collector. Thus as the sun moves, the position of the focused solar energy also moves relative to the fixed collector and is tracked by the movable receiver. An example of such a system is to be found in French Pat. No. 635,283 issued Dec., 1927 to Berland. Such systems conventionally utilize receivers which absorb solar energy and means within the enclosure through which a heat transfer media is circulated. Since temperatures on the order of 500° F., or higher, can be obtained, it is of course important to minimize energy losses. Also, since the collector is necessarily large, it is not a precision ground surface and, thus, though theoretically a small receiver will suffice, it has been found necessary to present a relatively large target for the reflected solar energy in view of aberrations resulting from imperfection in the nominally spherical collecting surface.

Conventional receivers, however, have now been found to be compromised in efficiency as a result of the unique requirements of the system utilized an articulated receiver in conjunction with a fixed collector.

SUMMARY OF THE INVENTION

The present invention, which provides a hereto unavailable improvement over previous receivers for fixed collector solar energy concentrating systems comprises a solar energy receiver having a solar energy transparent enclosure with an enlarged, generally bell shaped or flared portion at at least one end thereof. The receiver thus presents the solar energy transparent enclosure in such a manner as to avoid reflection from or excessive absorption by the enclosure by solar energy rays striking the enclosure at an acute angle.

Accordingly, an object of the present invention is to provide a new and improved receiver for solar energy which more effectively gathers the solar energy collected and focused on the receiver.

Another object of the present invention is to provide a new and improved articulated solar energy receiver which is movable to intercept and receive a large proportion of the solar energy focused thereon by a fixed, substantially spherical concave collector.

Yet another object of the present invention is to provide a new and improved solar receiver having therein wave trap means to intercept solar energy directed towards the receiver in such a manner as to not fall directly upon the conduit including the heat transfer medium.

Still another object of this invention is to provide a new and improved solar energy receiver which minimizes loss of solar energy focused on the receiver by a reflective collector.

These and other objects and features of the present invention will become apparent from the following description.

DETAILED DESCRIPTION OF THE INVENTION

Figure 2:
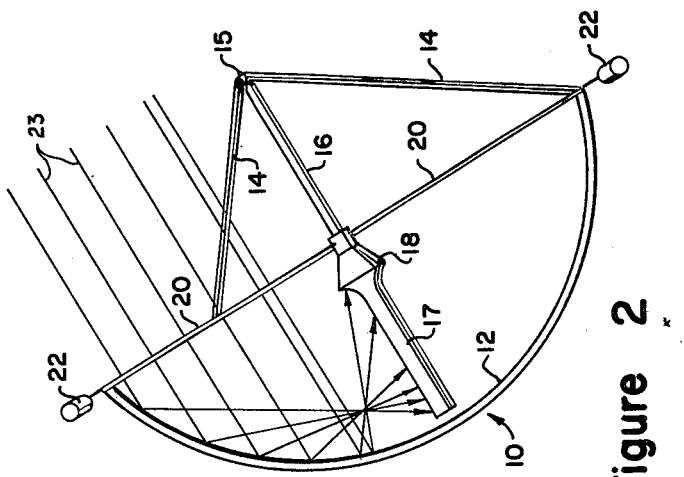
FIG. 2 is a sectional view of the solar energy concentrating system with the articulated receiver in a centered position.
Figure 1:
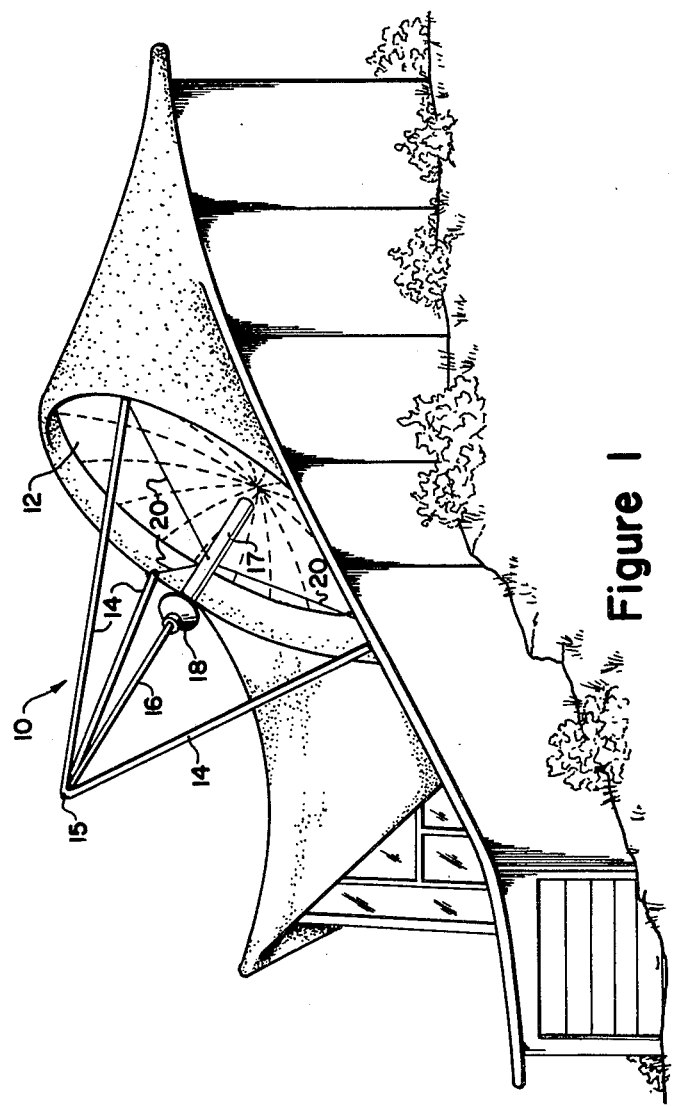
FIG. 1 is a perspective view of a building utilizing a solar energy concentrating system having an articulated receiver in accordance with the instant invention.
Figure 3:
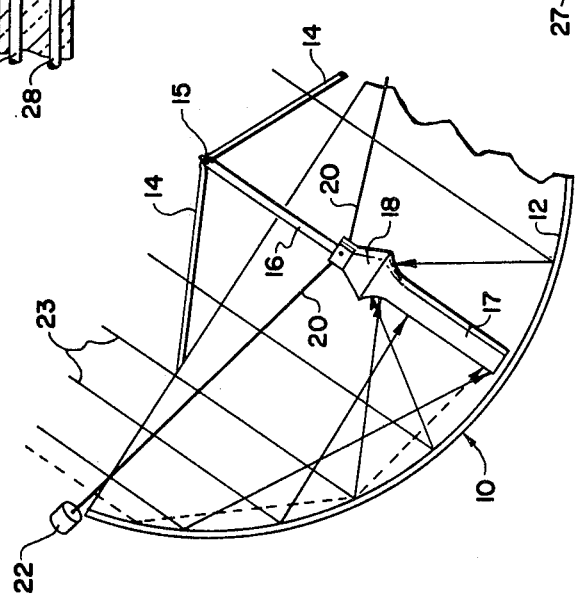
FIG. 3 is a view similar to FIG. 2 but illustrating the articulated receiver in an offset position.

Turning now to the drawings, wherein like components are designated by like reference numerals throughout the various figures, a solar energy collecting system in accordance with the instant invention is illustrated in FIG. 1 and generally designated by the reference numeral 10. As shown, concentrating system 10 includes collector 12, which is a relatively large, concave truncated spherical section fixedly supported. Struts 14, which extend to a common apex in front of collector 12 support articulation means 15 at the joinder thereof. Shaft 16 extends from articulation means 15 and is accordingly movable relative to struts 14. Receiver 17 is carried at the terminus of shaft 16 and includes at least one enlarged end portion 18. Guy wires 20, driven by tracking motors 22 as shown in FIGS. 2 and 3, position receiver 17 in an appropriate relationship relative to collector 12. As shown in FIGS. 2 and 3, shaft 16 and receiver 17 are aligned substantially parallel to the direction of incoming solar rays 23. Thus, when solar rays 23 are reflected from collector 12, a substantial portion of solar rays 23 are focused upon receiver 17. However, it will be noted that solar rays 23 incoming adjacent shaft 16 and receiver 17 are reflected from collector 12 and strike receiver 17 at a small angle relative to the axis of receiver 17. Accordingly, by providing enlarged portion 18, these rays are not reflected, but instead are intercepted by receiver 17.

Figure 4:
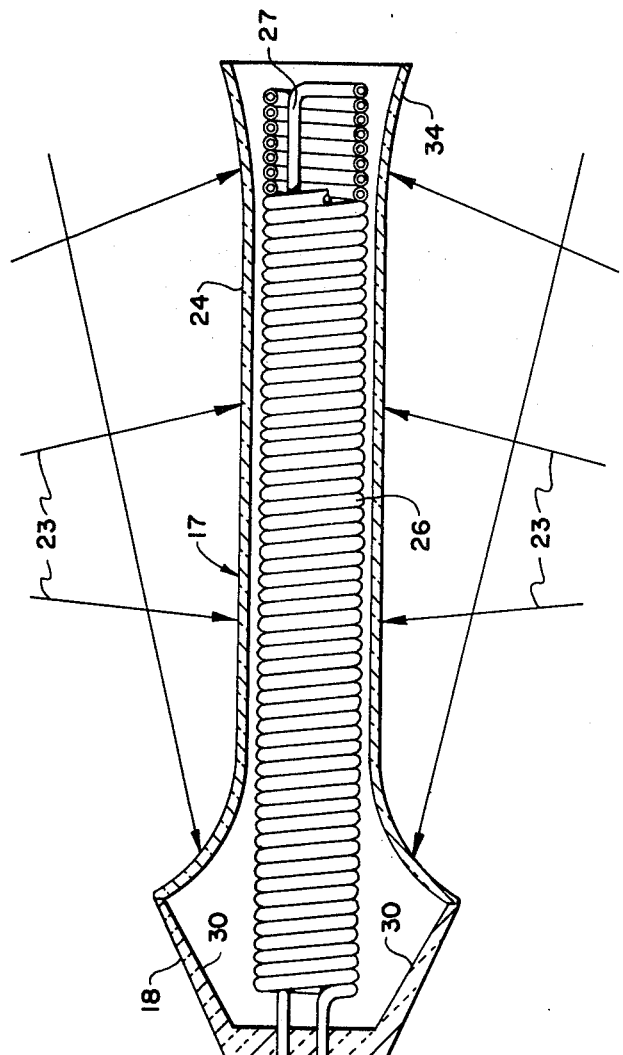
FIG. 4 is a sectional view of a preferred embodiment of a receiver in accordance with the instant invention.

The function of enlarged portion 18 will be more readily understood with reference to FIG. 4 which illustrates receiver 17 in a preferred embodiment. As shown, receiver 17 includes a solar energy radiation transparent enclosure 24, of, for instance, glass or plastic, and which houses solar energy utilization means such as heat transfer media conduit 26 having inlet 27 and outlet 28. The interior of enclosure 24 may be evacuated to limit convection losses. Also, internal of enlarged portion 18, reflective surface 30 is provided. Outer housing 32 of enlarged portion 18 is preferably of an insulating material. Alternatively, as shown in FIG.

5, conduit 26 may include an enlarged coil 33 complementary to enlarged portion 18 of outer housing 32. Optionally, the other end of receiver 17 may also have a second enlarged portion 34 at the end of enclosure 24 adjacent collector 12.

Thus, as can readily be seen from FIG. 4, solar rays 23 striking enclosure 24 are aligned and oriented to pass through enclosure 24 in a direction nearly normal to the surface of enclosure 24. Particularly at enlarged portion 18, enclosure 24 provides a short ready path for solar rays 23 which, if receiver 17 were cylindrical, would pass obliquely through receiver 17 with higher absorption, be reflected from enclosure 24, or not strike receiver 17 at all. Accordingly, a greater portion of solar rays 23 are intercepted by and passed through enclosure 24 for absorption than would be utilized by cylindrical receivers. Similarly, solar rays 23 reflected by the outer edges of collector 12 strike enclosure 24 at a less than right angle.

Also, as shown in FIG. 4, relfective surface 30 intercepts solar rays 23 entering through enclosure 24 substantially parallel to the axis of receiver 17. These rays are either absorbed by reflective surface 30, thus adding to the internal temperature of receiver 17, or, preferably, reflected onto conduit 26 for direct transfer to the heat transfer media flowing though conduit 26. Outer housing 32 is insulated to minimize conduction losses through the exterior of receiver 17.

In a preferred operation, a heat transfer media, which may be liquid or gaseous, is flowed through the interior of enclosure 24. Solar rays 23, which are substantially focused onto receiver 17 are absorbed and thus elevate the temperature of receiver 17 to, depending upon heat transfer media flow, temperatures ranging up to 500° F. or higher. After such energy is transferred to the heat transfer media, the heat flows through outlet 28 and, in a conventional manner, into a desired heat energy utilization or storage system (not shown).

While receiver 17 preferably employs conduit 26 to conduct a liquid heat transfer media having a high specific heat through receiver 17, it is of course possible to use other conduit means, and particularly concentric conduit means particularly useful for the relatively high flow rates necessary if a gaseous heat transfer media is employed.

Figure 5:
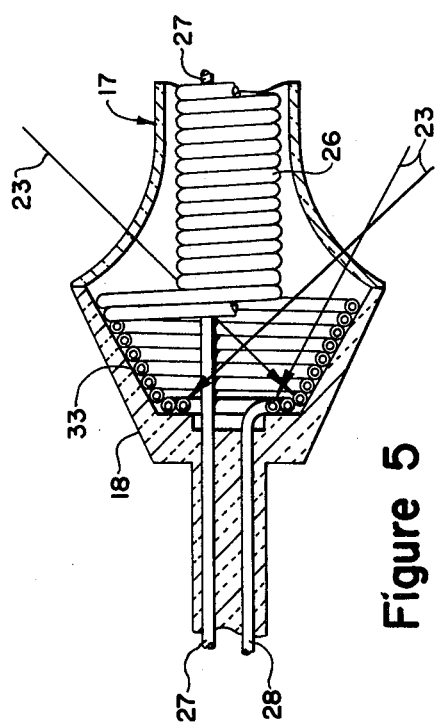
FIG. 5 is a view similar to FIG. 4 illustrating a portion of an alternative receiver.

Summarily then, receiver 17 is more efficient and effective to intercept and absorb solar rays 23 directed to receiver 17 by collector 12 as a result of the enlarged portions 18 and/or 34 on the ends of receiver 17. Enlarged portion 18 on the end of receiver 17 is most remote from collector 12 and is the more important. While a bell shaped or flared enlarged portion is preferred, enlarged portions 18 or 34 may be of many configurations. Also, relfective surface 30 is not necessary but tends to reflect and concentrate the solar energy in the preferred area, i.e., upon conduit 26 rather than merely absorbing the energy within receiver 17. Enlarged coil 33 of the embodiment of FIG. 5 serves a similar purpose by placing conduit 26 in a position to directly absorb such radiation.

Accordingly, by providing a receiver having at least one enlarged portion, or preferably, both ends of enlarged portions, the efficiency of the receiver is substantially enhanced. Also, while the illustrated preferred example discusses the use of a heat transfer medium, it is to be understood that other solar energy utilization means such as solar cells which directly produce an electromotive force in response to the solar energy may also be advantageously employed. Solar cells could be usefully mounted on at least a portion of the exterior of the receiver and would be more efficient with radiation striking at angles close to normal.

Although only several embodiments of the present invention have been illustrated and described, it is anticipated that various changes and modifications will be apparent to those skilled in the art, and that such changes may be made without departing from the scope of the invention as defined by the following claims.

What is claimed is:

1. An articulated solar energy receiver adapted for use with a concave, fixed collector having a central axis, comprising:
   an elongated member located with one end spaced from but adjacent to the concave face of the fixed collector and articulated for movement around a fixed point spaced from, and substantially on the axis of, the concave, fixed collector, the elongated member having means for utilizing solar energy disposed substantially along the entire length of the member, the elongated member further having at least one end portion of enlarged cross section relative to the central portion of the receiver, whereby solar energy reflected and concentrated by the fixed collector will be more completely intercepted by the receiver at the enlarged cross section and, accordingly, more solar energy will be directed to the means for utilizing solar energy.

2. An articulate solar energy receiver as set forth in claim 1 in which the means for utilizing solar energy comprises a conduit extending through the length of the interior of the receiver and the surface of the elongated member comprises a radiation transparent enclosure, with the enlarged cross section being defined by the radiation transparent enclosure.

3. An articulated solar energy receiver as set forth in claim 2 in which the interior of the receiver as defined by the radiation transparent enclosure is substantially evacuated.

4. An articulated solar energy reciever as set forth in claim 2 in which the conduit is in the form of a helix formed substantially around the longitudinal axis of the receiver and the radiation transparent enclosure is of a substantially concentric, circular cross section relative to the helix.

5. An articulated solar receiver as set forth in claim 4 in which the portion of the conduit adjacent the enlarged portion of the enlarged cross section of the receiver is also of an enlarged cross section relative to at least a portion of the remainder of the conduit helix.

6. An articulated solar energy receiver as set forth in claim 2 in which a reflective surface is positioned within the receiver at at least one end of the receiver having an enlarged cross section.

7. An articulated solar energy receiver as set forth in claim 2 in which both ends of the radiation transparent enclosure are of enlarged cross sections.

* * * * *